(12) United States Patent
Bosch et al.

(10) Patent No.: US 8,111,698 B2
(45) Date of Patent: Feb. 7, 2012

(54) METHOD OF PERFORMING A LAYER OPERATION IN A COMMUNICATIONS NETWORK

(75) Inventors: Peter Bosch, New Providence, NJ (US); Sape Mullender, North Plainfield, NJ (US); Girija Narlikar, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 615 days.

(21) Appl. No.: 11/094,436

(22) Filed: Mar. 31, 2005

(65) Prior Publication Data

US 2006/0222010 A1   Oct. 5, 2006

(51) Int. Cl.
*H04L 12/28* (2006.01)
*H04L 12/56* (2006.01)
*H04J 3/16* (2006.01)
*H04J 3/22* (2006.01)
*H04J 3/24* (2006.01)

(52) U.S. Cl. .......................... 370/394; 370/469; 370/903

(58) Field of Classification Search .................. 370/469, 370/328, 320, 338, 401, 903, 465, 468
See application file for complete search history.

(56) References Cited

U.S. PATENT DOCUMENTS

| | | | |
|---|---|---|---|
| 6,272,216 B1 * | 8/2001 | Vaios ......................... | 379/265.01 |
| 6,438,108 B1 * | 8/2002 | Kanljung et al. .............. | 370/249 |
| 6,519,223 B1 * | 2/2003 | Wager et al. .................. | 370/216 |
| 6,944,182 B1 * | 9/2005 | Amagai et al. ................. | 370/466 |
| 6,961,327 B2 * | 11/2005 | Niu ................................ | 370/338 |
| 7,489,706 B2 * | 2/2009 | Hatley et al. ................... | 370/469 |
| 2002/0089952 A1 * | 7/2002 | Cao et al. ....................... | 370/335 |
| 2002/0118639 A1 * | 8/2002 | Chintada et al. ............... | 370/230 |
| 2003/0026255 A1 * | 2/2003 | Poeluev et al. ................. | 370/392 |
| 2003/0050954 A1 * | 3/2003 | Tayyar et al. .................. | 709/102 |
| 2003/0067903 A1 * | 4/2003 | Jorgensen ...................... | 370/338 |
| 2003/0165162 A1 | 9/2003 | Westphal | |
| 2003/0206534 A1 * | 11/2003 | Wu ................................ | 370/328 |
| 2004/0033801 A1 * | 2/2004 | Yi et al. ......................... | 455/428 |
| 2004/0137916 A1 * | 7/2004 | Syrjarinne et al. ........... | 455/456.1 |
| 2004/0218579 A1 * | 11/2004 | An ................................. | 370/349 |
| 2004/0264370 A1 * | 12/2004 | Moon et al. .................... | 370/229 |
| 2005/0047405 A1 * | 3/2005 | Denzel et al. .................. | 370/388 |
| 2005/0147041 A1 * | 7/2005 | Zaki et al. ...................... | 370/235 |
| 2005/0237964 A1 * | 10/2005 | Kupershmidt ................ | 370/321 |
| 2006/0140121 A1 * | 6/2006 | Kakani et al. .................. | 370/235 |
| 2006/0234724 A1 * | 10/2006 | Syrjarinne et al. ........... | 455/456.1 |
| 2007/0159985 A1 * | 7/2007 | Sunell et al. ................... | 370/254 |

FOREIGN PATENT DOCUMENTS

| | | | |
|---|---|---|---|
| EP | 1 059 792 A2 | | 5/2000 |
| EP | 1059792 A2 * | | 12/2000 |
| EP | 1 372 310 A1 | | 6/2002 |
| EP | 1372310 A1 * | | 12/2003 |

OTHER PUBLICATIONS

PCT International Search Report dated Aug. 9, 2006 for corresponding PCT Application No. PCT/US2006/010260.

* cited by examiner

*Primary Examiner* — Xavier Szewai Wong
(74) *Attorney, Agent, or Firm* — Harness, Dickey & Pierce

(57) ABSTRACT

In an embodiment of the present invention, a scheduling operation is performed at a lower layer based on upper layer information. In another embodiment of the present invention, an action is performed at an upper layer based on received lower layer information. Also, a scheduling operation may be performed on at least one upper layer data packet at a lower layer based on a lower layer analysis of the upper layer data packet.

7 Claims, 5 Drawing Sheets

METHOD OF PERFORMING A LAYER OPERATION IN A COMMUNICATIONS NETWORK

BACKGROUND OF THE INVENTION

1. Field of the Invention

The present invention relates generally to a method of performing a layer operation in a communications network.

2. Description of the Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless telephony standard which describes a set of protocol standards. For example, UMTS sets forth the protocol standards for the transmission of voice and data between a base station (BS) and a mobile or user equipment (UE). The UMTS is divided into a plurality of layers. Layer-1 protocols handle digital radio transmission (e.g., encoding data packets for transmission, decoding received data packets, forward error correction, etc.). Layer-2 protocols (e.g., radio link control (RLC)) handle data packet operations such as data packet fragmentation and reassembly, error detection and retransmission, scheduling data packet delivery, etc. Layer-3 protocols include end-to-end protocols (e.g., IP, TCP, UDP, RTP, etc.). The layer numbers denote a layer hierarchy where lower layer numbers indicate lower layers relative to higher layer numbers, and vice versa.

However, the layers do not necessarily communicate with each other. In other words, information determined at a given layer or extracted from operations at a given layer is typically unavailable at other layers. Also, with regard to the transmission of data packets, layers do not examine data packet contents received from upper layers, instead performing layer specific operations (e.g., encapsulation) and passing the data packets to a lower layer.

SUMMARY OF THE INVENTION

In an embodiment of the present invention, a lower layer receives upper layer information from an upper layer. The lower layer performs a scheduling operation based on the received upper layer information. For example, if the upper layer information is a time stamp associated with a delivery deadline for an upper layer data packet, the lower layer discards the upper layer data packet if the time stamp associated with the upper layer data packet is expired.

In another embodiment of the present invention, a lower layer receives at least one upper layer data packet from the upper layer. The lower layer analyzes the at least one upper layer data packet and determines a scheduling operation. For example, the lower layer may modify the at least one upper layer data packet if the at least one upper layer data packet is an acknowledgment and an additional data packet to be acknowledged is received at the lower layer after the acknowledgment is generated. The modification may be to include a further acknowledgment for the additional data packet in the upper layer data packet.

In another embodiment of the present invention, an upper layer receives lower layer information from a lower layer. The upper layer performs an action based on the received lower layer information. For example, the upper layer disables header compression on at least one data packet if the lower layer information indicates a lost data packet.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE INVENTION

In order to better understand the present invention, examples of integrated base stations will be described. This will be followed by a description of example methodologies of the present invention implemented at integrated base stations.

First Example Integrated Base Station

Figure 1:
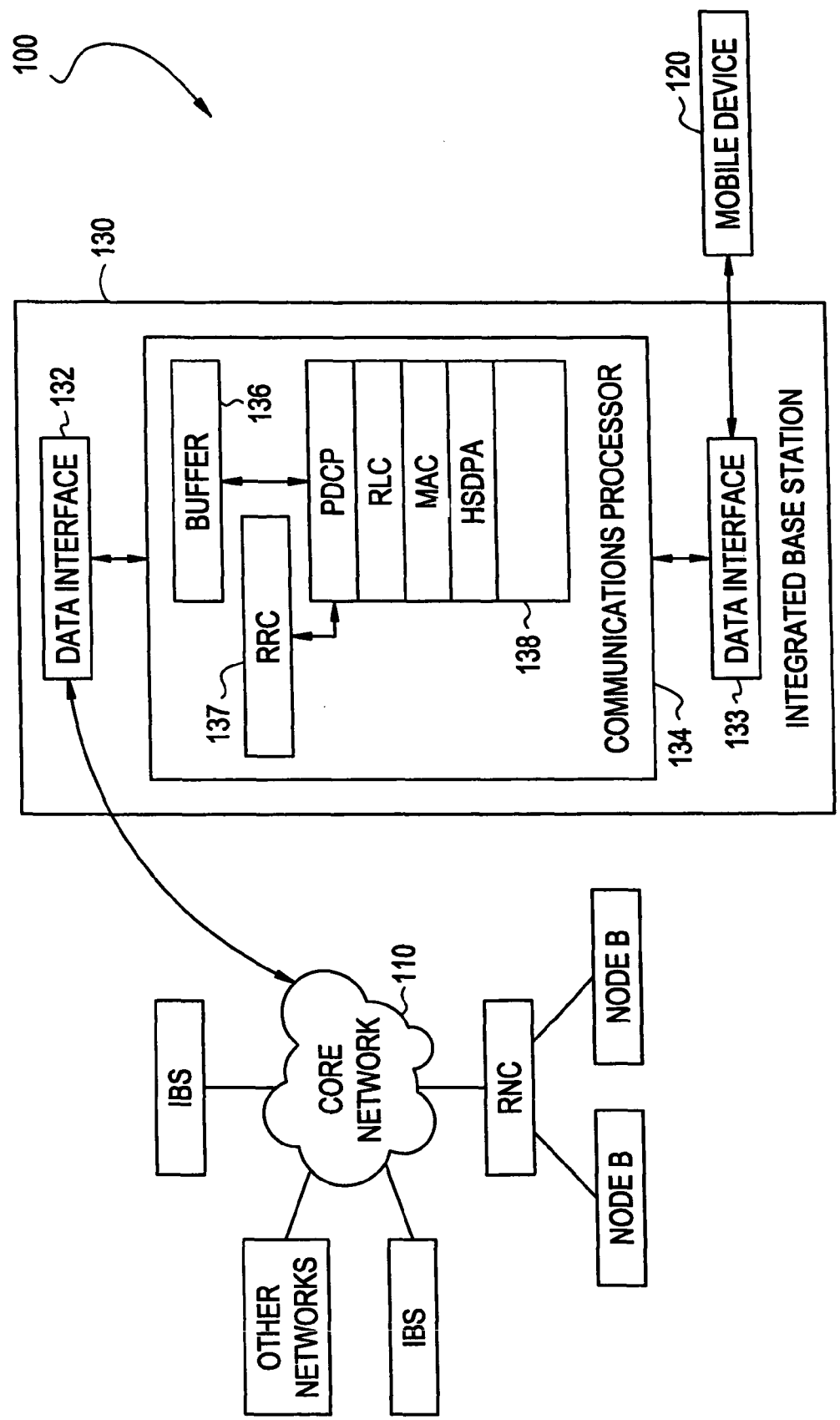
FIG. 1 illustrates a block diagram of a cellular communications system for mobile devices including an integrated base station according to an example embodiment of the present invention.

FIG. 1 illustrates a block diagram of a cellular communications system 100 for mobile devices including an integrated base station 130 according to an example embodiment of the present invention. The communications system 100 also includes a core network 110 and a mobile device 120.

The communications system 100 may be a conventional communications system such as a Universal Mobile Telecommunications System (UMTS) having multiple communications nodes coupled through wireless or wired mediums. Of course, the communications system 100 may be another type of communications system, such as, a Global System for Mobile Communications (GSM). Thus, one skilled in the art will understand that the discussion regarding a UMTS also applies to other cellular communications systems and components. For ease of discussion, the integrated base station 130 is representative of the other integrated base stations that are illustrated. One skilled in the art will also understand that the communications system 100 may include additional components or systems that are not illustrated or discussed, but are typically employed in a conventional communications system.

The core network 110 may be a conventional core network configured to handle voice and (IP) back-haul. The core network 110 includes communication nodes or switches coupled via connection lines. As illustrated, the core network 10 connects the integrated base station 130 to other integrated base stations and conventional RNCs and Node Bs. Additionally, the core network 110 can provide gateways to other networks (ISDN, Internet, etc.).

The mobile device 120 may be a conventional cellular telephone configured to operate in the communications system 100. Thus, the mobile device 120 may be a UMTS enabled cellular telephone. One skilled in the art will also understand that the mobile device 120 may also be another wireless device that is configured to operate in the communications system 100, such as, a personal digital assistant (PDA), a computer, an MP3 player, etc.

The integrated base station 130 is coupled to the core network 110 via a wired connection and to the mobile device 120 via a wireless connection. The integrated base station 130 is configured to include the functionality of a conventional RNC and a conventional Node B in a single processing entity. The integrated base station 130 includes a first data interface 132, a second data interface 133 and a communications processor 134 having a protocol stack 138, a buffer 136 and a Radio Resource Control (RRC) layer 137. One skilled in the art will understand that the integrated base station 130 includes additional components or features that are not material to the present invention but are typically employed in a conventional RNC or Node B to transmit data units between a core network and a mobile device.

The first data interface 132 is configured to transmit and receive data units from the core network 110, and the second data interface 133 is configured to transmit and receive data units from the mobile device 120. The first data interface 132 includes conventional components to transmit and receive data units over a wired connection to the core network 110, and the second data interface 133 includes conventional components to transmit and receive data units over a wireless connection to the mobile device 120. One skilled in the art will understand the operation and configuration of the first data interface 132 and the second data interface 133.

The communications processor 134 is configured to process data units from the first data interface 132 and the second data interface 133. The buffer 136 is configured to queue data units from the core network 110 for the protocol stack 138. In FIG. 1, the buffer 136 is located on top of the protocol stack 138.

The protocol stack 138 is configured to produce data units suitable for direct transmission to the mobile device 120. Thus, the protocol stack 138 provides a single location that receives data units from the core network 110 and transmits the data units with the proper protocols to the mobile device 120. The protocol stack 138 includes a Packet Data Convergence Protocol (PDCP) layer, a Radio Link Control (RLC) layer, a Media Access Control (MAC) layer, and a High Speed Downlink Packet Access (HPSPA) layer. Of course, one skilled in the art will understand that the protocol stack 138 may include other or additional protocol layers in other embodiments. In some embodiments, the HPSPA layer may not be included in the protocol stack 138. Additionally, considering a CDMA2000 system, the protocol stack 138 may be extended to include such layer-2 protocol functionality as point-to-point protocol (PPP) layer and radio link protocol (RLP) layer instead of the PDCP layer and the RLC layer that is associated with a UMTS.

Second Example Integrated Base Station

Figure 2:
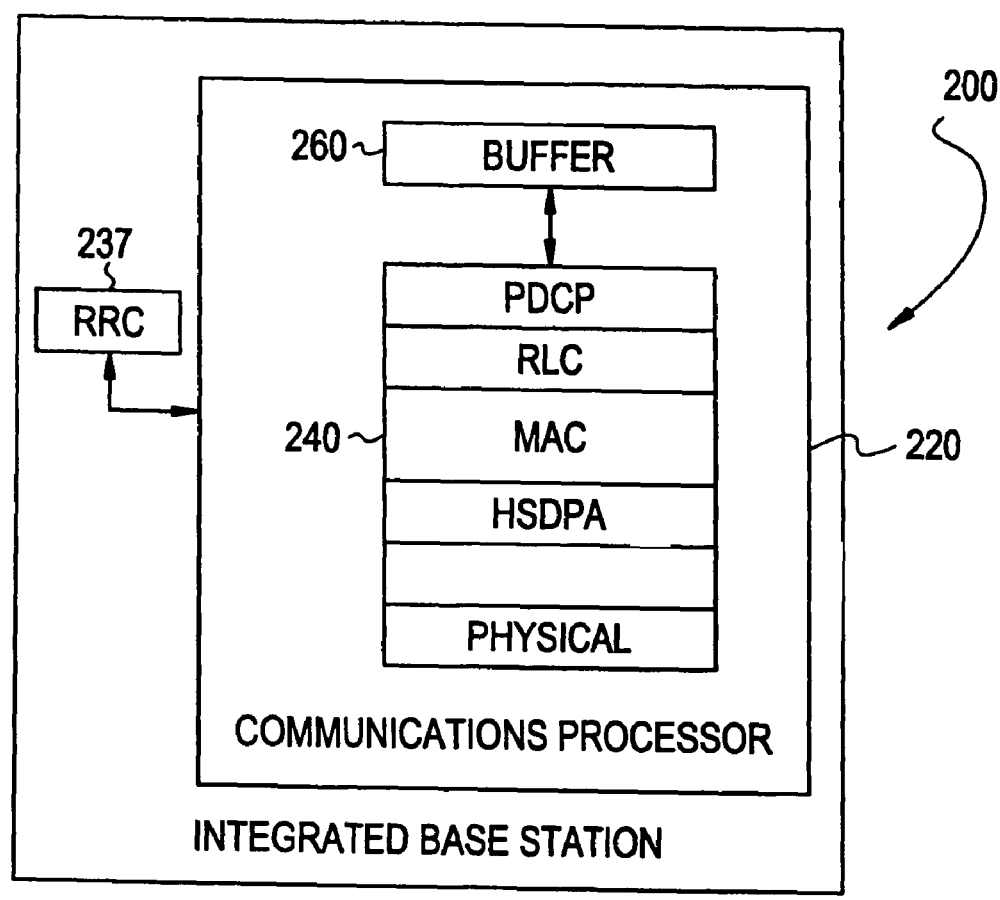
FIG. 2 is a block diagram illustrating an integrated base station according to another example embodiment of the present invention.

FIG. 2 is a block diagram illustrating an integrated base station 200 according to another example embodiment of the present invention. The integrated base station 200 includes a Radio Resource Control (RRC) layer 237 and a communications processor 220 having a protocol stack 240 and a buffer 260. Similar to FIG. 1, the RRC layer may be included within a communications processor in some embodiments.

The communications processor 220 is configured to process data units received over a communications network for mobile devices. More specifically, the communications processor 220 is configured to provide the needed protocols for transmitting a data unit between a core network and a mobile device. One skilled in the art will understand that the communications processor 220 includes additional components that are not material to the invention and are not illustrated or discussed.

The protocol stack 240 includes a PDCP layer, a RLC layer, a MAC layer and a physical layer. The physical layer may interpret signals on a circuit switched physical channel (e.g., a dedicated physical channel (DPDCH)). Integrated within the MAC layer is the functionality of a HSDPA layer. Thus, the MAC layer is configured to perform independent transmission decisions based on channel conditions associated with a wireless device. Of course, as illustrated in FIG. 1, a HSDPA layer can be interposed between the MAC layer and the physical layer. Additionally, in other cellular communications systems, the MAC layer may have other packet schedule modes integrated therein. For example, in a CDMA2000 system, the MAC layer may include the functionality of a DO or DV layer.

The buffer 260 may be a conventional buffer configured to queue data units between a wired and wireless channel. The buffer 260 is located on top of the protocol stack 240. Positioning the buffer 260 above the PDCP layer allows the buffer 260 to queue uncompressed data units. Thus, the buffer 260 may be positioned between the IP (not shown) and PDCP layers to provide a single queue for data units. The buffer 260 is configured to match speed differences between the wired and wireless domains.

Example Methodologies

Example methodologies of layer operations will now be described with reference to the above-described integrated base stations 130/200. It is understood that layer operations according to other example embodiments may be implemented with base stations other than the above-described integrated base stations 130/200.

Figure 3:
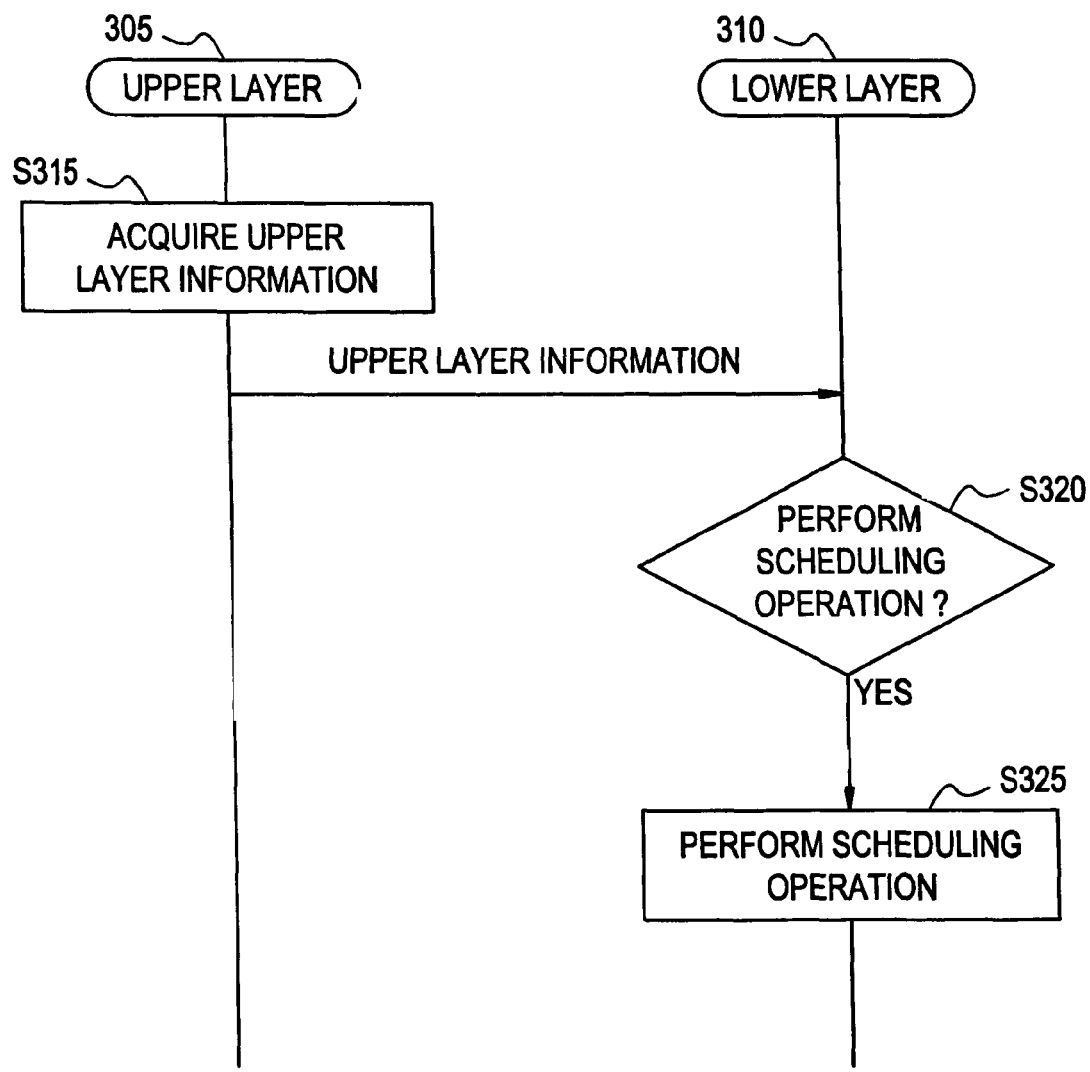
FIG. 3 illustrates a communication flow diagram for performing a lower layer operation according to another example embodiment of the present invention.

FIG. 3 illustrates a communication flow diagram for performing a lower layer operation according to an example embodiment of the present invention. In order to better understand the lower layer operation illustrated by FIG. 3, a generic operation will be described followed by specific examples.

As shown, in step S315, an upper layer 305 may acquire upper layer information. The upper layer 305 may comply with any well-known upper layer protocol such as a layer-2 protocol, a layer-3 protocol, IP, UDP, TCP, RTP, VoIP, etc. The upper layer information may be any type of information extracted or determined at the upper layer 305 in accordance with the upper layer protocol. Examples of the upper layer information will be given later.

Referring to FIG. 3, after the upper layer information is acquired in step S315, the upper layer 305 sends the upper layer information to a lower layer 310. The lower layer 310 may comply with any well-known protocol at a layer level lower than the upper layer 305. For example, the lower layer 310 may handle layer-1 protocols, layer-2 protocols, Hybrid ARQ, UMTS/AM-RLC, UMTS/AM-RUC, UMTS/HSDPA, etc.

In step S320, according to one embodiment the lower layer 310 determines whether to perform a scheduling operation based on the upper layer information received from the upper layer 305 in step S315. Different types of upper layer information may trigger different scheduling operations. Examples of the scheduling operations will be given later.

In step S325, the scheduling operation is performed on a scheduling queue at the lower layer 305 based on the analysis in step S325. The scheduling queue is a prioritized list of data packets scheduled for transmission to the mobile device 120 from the integrated base station 130/200.

Examples will now be given with respect to the communication flow diagram of FIG. 3. The following examples describe different types of upper layer information and respective lower layer scheduling operations in response to the upper layer information.

In the following examples given with reference to FIG. 3, the upper layer information is a time stamp in an upper layer data packet. The time stamp for the upper layer data packet is the expiration deadline for delivery of the upper layer data packet from the lower layer 310 to, for example, the mobile device 120. Further, if explicit time stamps are unavailable, the time stamp may be estimated based on the arrival of the data packet at the upper layer 305 (e.g., layer-3).

In an example, in step S320, at least one packet scheduler at a lower layer 310 such as layer-1 of a HSDPA packet scheduler in layer-1 of a UMTS, a DO packet scheduler in layer-1 of a CDMA system, etc. is invoked. In this example, the lower layer 310 may handle both a layer-1 protocol and a layer-2 protocol and the upper layer 305 handles a layer-3 protocol (e.g., VoIP) of the integrated base station 130/200. The packet scheduler analyzes the time stamp for a first data packet (e.g., the data packet with the highest priority on the scheduling queue). The lower layer 310 determines that different scheduling operations based on whether the time stamp has expired, the time stamp is earlier than a timing threshold and/or the time stamp is later than a timing threshold. The timing threshold may be determined fixed to an empirically determined value or based on characteristics of the scheduling queue. With respect to the latter, for example, if there are no urgent data packets for delivery, the timing threshold may be later than if there are urgent data packets for delivery.

In step S325, if the time stamp has expired, the scheduling operation may be to remove the upper layer data packet from the scheduling queue because the upper layer data packet is no longer useful. For example, in VoIP and other transport protocols for transmitting isochronous data (e.g., audio and/or video), a data packet may not be useful if it is received after its deadline. The layer-1 retransmission mechanism (i.e., Hybrid ARQ in UMTS/HSDPA) stops attempting to retransmit the upper layer data packet. Likewise, the layer-2 retransmission mechanism (i.e., UMTS/AM-RLC) and segmentation mechanism (i.e., UMTS/UM-RLC) discards a partially transmitted or received data packet.

If the time stamp is earlier than the timing threshold, the scheduling operation may be to decrease the priority of the upper layer data packet on the scheduling queue to allow other data packets with time stamps closer to expiration to achieve a higher priority. Both of the layer-1 and layer-2 schedulers may reduce the priority of the upper layer data packet. Further, at the layer-1 scheduler (e.g., a UMTS/HSDPA or CDMA/DO scheduler), aggressive channel transmission parameters (e.g., fewer error bits, etc.) may be selected for transmitting the data packet since sufficient time exists for a retransmission if there is a packet transfer failure.

If the time stamp is later than the timing threshold but has not expired, the scheduling operation may be to increase the priority of the upper layer data packet on the scheduling queue. If possible, both of the layer-1 and layer-2 schedulers may increase the priority of the upper layer data packet. Further, at the layer-1 scheduler (e.g., a UMTS/HSDPA or CDMA/DO scheduler), conservative channel transmission parameters (e.g., more error bits, more reliable coding, etc.) may be selected for the data packet since sufficient time may not be available for a retransmission.

Figure 4:
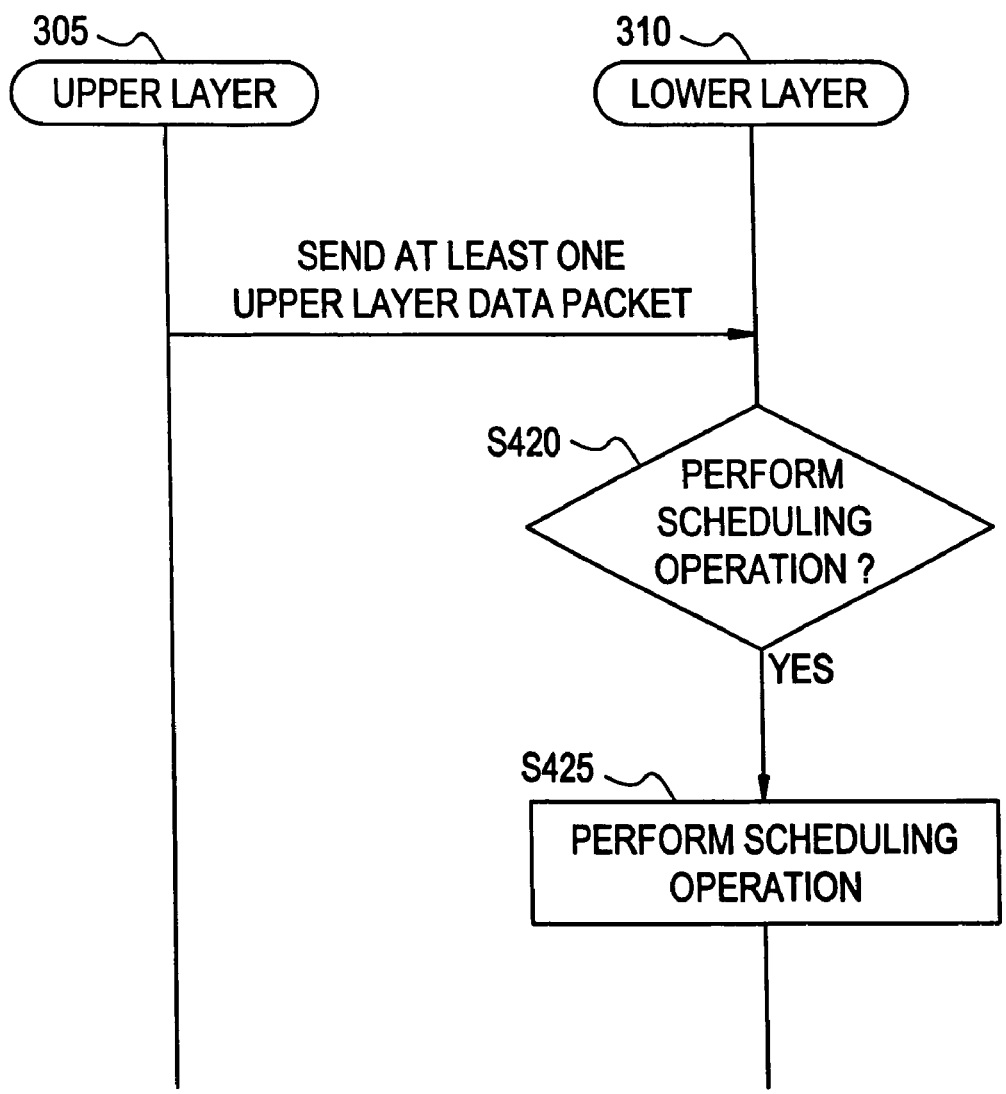
FIG. 4 illustrates another communication flow diagram for performing a lower layer operation according to an example embodiment of the present invention.

FIG. 4 illustrates another communication flow diagram for performing a lower layer operation according to an example embodiment of the present invention. In order to better understand the lower layer operation illustrated by FIG. 4, a generic operation will be described followed by specific examples.

Referring to FIG. 4, the upper layer 305 sends at least one upper layer data packet to the lower layer 310. The lower layer 310 analyzes the contents of the lower layer data packet in step S420. The lower layer 310 determines whether to perform, for example, a scheduling action or operation on the received at least one upper layer data packet based on the analysis in step S420. The lower layer 310 may perform the action on the at least one upper layer data packet in step S425.

In an example, with reference to FIG. 4, the at least one upper layer data packet is a retransmitted upper layer data packet. After a given period of time without receiving an acknowledgment in response to an originally sent upper layer data packet, the upper layer 305 retransmits the upper layer data packet via the lower layer 310. In this example, the lower layer 310 handles layer-2 protocols and the upper layer 310 handles layer-3 protocols. In step S420, the layer-2 scheduler at the lower layer 310 analyzes the retransmitted upper layer data packet and determines whether a duplicate of this retransmitted upper layer data packet exists in the scheduling queue. If the duplicate exists, the scheduling operation in step S425 is elimination of the retransmitted upper layer data packet from the scheduling queue in favor of only transmitting the duplicate already existing in the scheduling queue, thereby avoiding a redundant retransmission of the upper layer data packet.

In another example, with reference to FIG. 4, the upper layer data packet includes an acknowledgment. In this example, the lower layer 310 handles layer-2 protocols and the upper layer 305 handles layer-3 protocols. The upper layer 305 analyzes received data packets to generate acknowledgments. The acknowledgment indicates the data packets which have been received at the upper layer 305 from, for example, the mobile device 120. The upper layer 305 sends the acknowledgment via the lower layer 310 for transmission to the mobile device 120. In step S420, the layer-2 scheduler at the lower layer 310 analyzes the acknowledgment to determine whether a scheduling operation is required.

In step S425, the scheduling operation may be changing or discarding the acknowledgment. For example, if an additional data packet is received at the lower layer 310 after the generation of the acknowledgment from the upper layer, the layer-2 scheduler at the lower layer 310 modifies the acknowledgment to include a further acknowledgment for the additional data packet. Likewise, when a next acknowledgment is received from the upper layer 305 for the additional data packet, the acknowledgment is changed or discarded because the additional data packet has already been acknowledged in the previous acknowledgment. For example, if the next acknowledgment acknowledges only the additional data packet, the next acknowledgment is discarded because the previous modified acknowledgment already acknowledged receipt of the additional data packet. If the next acknowledgment acknowledges the additional data packet as well as other subsequently received data packets, the next acknowledgment is modified so as to not include the redundant acknowledgment of the additional data packet. Thus, unnecessary retransmissions may be avoided (e.g., of acknowledgments, of data packets, etc.). Also, the next acknowledgment may be changed to acknowledge a data packet received at the lower layer 310.

In yet another example, with reference to FIG. 4, the at least one upper layer data packet may include a plurality of acknowledgments scheduled for transmission in radio frames. In this example, the lower layer 310 handles layer-2 protocols and the upper layer 305 handles layer-3 protocols. A radio frame is a time interval where data may be transmitted and/or received. The upper layer 305 schedules the plurality of acknowledgments for transmission in the radio frame and sends the scheduled acknowledgments to the lower layer 310. In step S420, the layer-2 scheduler at the lower layer 310 analyzes the plurality of acknowledgments and determines a scheduling operation. In step S425, the scheduling operation may be either the rescheduling of the plurality of acknowledgments for transmission in a plurality of radio frames or the compressing of the plurality of acknowledgments for transmission in a single radio frame. For example, if there is not enough bandwidth to send the plurality of acknowledgments in the single radio frame, the scheduling operation of step S425 spreads the plurality of acknowledgments among a plurality of radio frames. Alternatively, if bandwidth in the single radio frame is less limited, the scheduling operation compresses the plurality of acknowledgments for transmission in the single radio frame.

Figure 5:
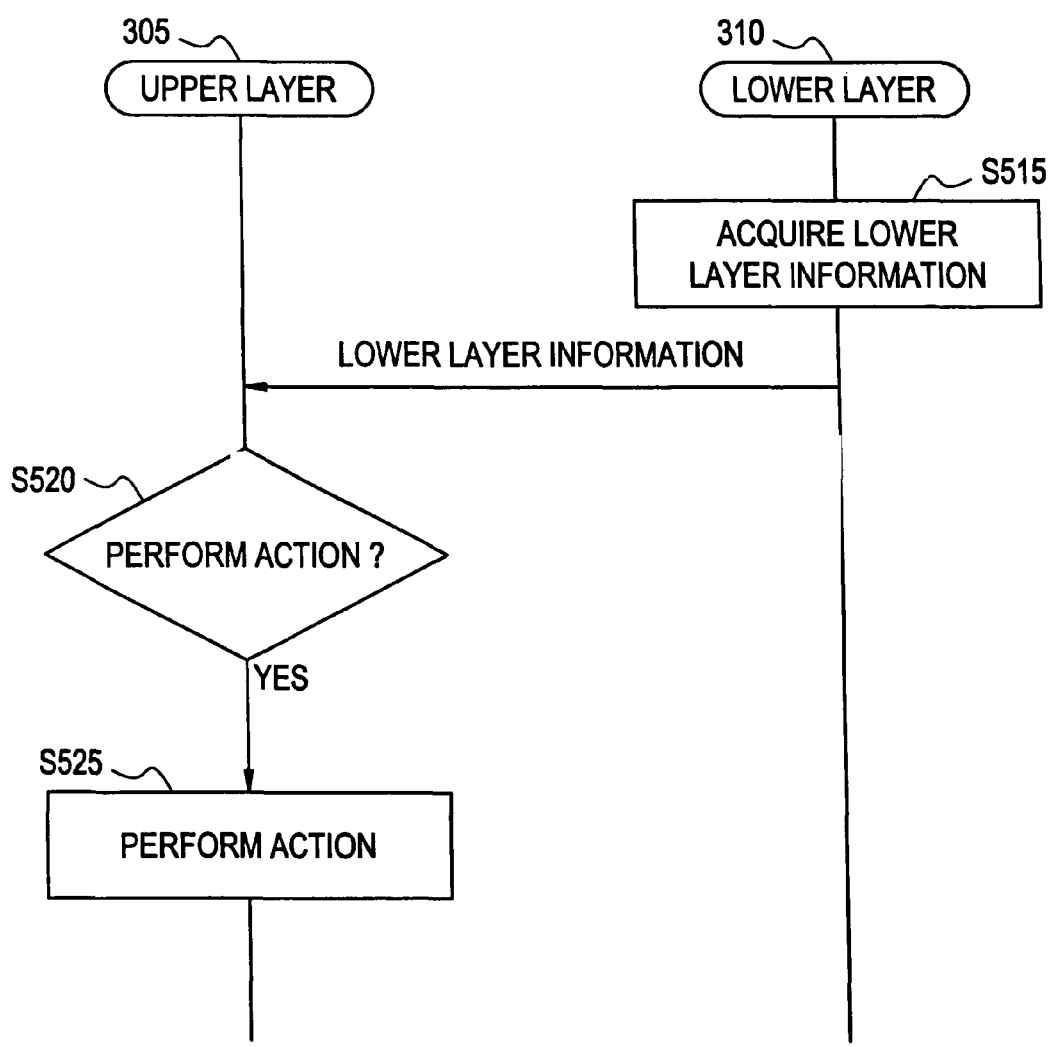
FIG. 5 illustrates a communication flow diagram for performing an upper layer operation according to another example embodiment of the present invention.

FIG. 5 illustrates a communication flow diagram for performing an upper layer operation according to another example embodiment of the present invention.

As shown in FIG. 5, in step S515, the packet scheduler (e.g., HSDPA packet scheduler, DO packet scheduler, etc.) at the lower layer 310 may extract or determine lower layer information. In the following example, the lower layer information is an indication of a lost data packet in a stream of data packets sent from the integrated base station 130/200 to the mobile device 120. However, it is understood that in other example embodiments of the present invention, the lower layer information may include any type of information (e.g., channel parameters) accessible to the packet scheduler at the lower layer 310. Further, in the following example, the lower layer 310 handles layer-1 protocols and the upper layer 305 handles layer-3 protocols. It is further understood that the upper layer 305 and the lower layer 310 may handle layer protocols other than layer-3 and layer-1, respectively, in other examples.

After the step S515, the lower layer information is sent to the upper layer 305. In step S520, the upper layer 305 analyzes the received lower layer information to determine whether to perform an action. In this example, the action is triggered by the lower layer information being an indication of a lost data packet in a stream of data packets.

In step S525, the action is performed at the upper layer 305. In this example, the action is to disable header compression on at least one subsequent data packet following the lost data packet. When a series of data packets are sent from the integrated base station 130/200, the upper layer 305 (e.g., complying with TCP, RTP, etc.) may enable header compression (e.g., Van-Jacobsen header compression in TCP, Robust Header Compression (ROHC) in RTP, etc.) on the data packets. The header compression reduces the size of data packet headers for data packets in a stream of data packets, and thereby allows for an increased data transfer rate (e.g., because less bandwidth is allotted for headers). However, when the header of a data packet is compressed, the "missing" header information is acquired from another data packet (e.g., an earlier or previous data packet in the stream of data packets). Thus, disabling header compression for a next data packet (e.g., or further subsequent data packets as necessary) after a lost data packet may allow proper decoding of the next data packet(s) at the receiving end (e.g., the mobile device 120) irrespective of the lost data packet.

While the above given example with reference to FIG. 4 has been given with respect to disabling header compression in response to a lost data packet, it is readily understood that other types of actions may be executed in response to other types of lower layer information.

The example embodiments of the present invention being thus described, it will be obvious that the same may be varied in many ways. For example, while the above described example methodologies have been given with respect to communication at the integrated base station 130/200, it is understood that other example embodiments of the present invention may be employed in any system where layer protocols may be capable of communication. Further, while the integrated base station 130/200 in the above described example embodiments has been described as communicating with the mobile device 120, it is understood that in other example embodiments any device capable of communication on a wireless and/or wired communication network may be employed in communication with the integrated base station 130/200. Such variations are not to be regarded as a departure from the spirit and scope of the exemplary embodiments of the invention, and all such modifications as would be obvious to one skilled in the art are intended to be included within the scope of the following claims.

We claim:

1. A method of managing data communication in a wireless network, comprising:
    acquiring, at an upper layer process of a processor of a network element, a time stamp associated with an upper layer data packet to be sent to a lower layer;
    analyzing, at the lower layer process of the network element, the time stamp associated with the upper layer data packet;
    changing, at the lower layer process of the network element, a priority of the upper layer data packet based on the time stamp received from the upper layer, the changing of the priority of the upper layer data packet being one of delaying or advancing transmission of the upper layer data packet based on a comparison of the time stamp to a timing threshold, the time stamp being a delivery deadline,
    wherein an upper layer associated with the received upper layer information handles at least one of Internet Protocol (IP), User Datagram Protocol (UDP), Transmission Control Protocol (TCP), Real-time Transport Protocol (RTP) and Voice Over Internet Protocol (VoIP) protocols,
    wherein the lower layer handles at least one of Hybrid Automatic Repeat Request (ARQ), Acknowledged Radio Link Control (AM-RLC), Radio Link Control-Unacknowledged Mode Radio Link Control (UM-RLC), Media Access Control (MAC) and High Speed Downlink Packet Access (HSDPA) protocols.

2. The method of claim 1, wherein the priority of the upper layer data packet is decreased if the time stamp is earlier than the timing threshold and has not expired.

3. The method of claim 1, wherein the priority of the upper layer data packet is increased if the time stamp is later than the timing threshold and has not expired.

4. A method of managing data communication in a wireless network, comprising:

changing, at a lower layer process of a network element, a priority of a data packet at the lower layer by comparing received upper layer information against a timing threshold, wherein the upper layer information is a time stamp in an upper layer data packet, the time stamp being a delivery deadline, wherein an upper layer associated with the received upper layer information handles at least one of Internet Protocol (IP), User Datagram Protocol (UDP), Transmission Control Protocol (TCP), Real-time Transport Protocol (RTP) and Voice Over Internet Protocol (VoIP) protocols, wherein the lower layer handles at least one of Hybrid Automatic Repeat Request (ARQ), Acknowledged Radio Link Control (AM-RLC), Radio Link Control-Unacknowledged Mode Radio Link Control (UM-RLC), Media Access Control (MAC) and High Speed Downlink Packet Access (HSDPA) protocols.

5. The method of claim 4, wherein the priority of the upper layer data packet is decreased if the time stamp is earlier than the timing threshold and has not expired.

6. The method of claim 4, wherein the priority of the upper layer data packet is increased if the time stamp is later than the timing threshold and has not expired.

7. A method of managing data communication in a wireless network, comprising:

changing, at a lower layer process of a network element, a priority on at least one upper layer data packet based on a lower layer analysis of the at least one upper layer data packet, wherein the lower layer analysis includes comparing a time stamp associated with the at least one upper layer data packet against a timing threshold, the time stamp being a delivery deadline, wherein an upper layer associated with the received upper layer information handles at least one of Internet Protocol (IP), User Datagram Protocol (UDP), Transmission Control Protocol (TCP), Real-time Transport Protocol (RTP) and Voice Over Internet Protocol (VoIP) protocols, wherein the lower layer handles at least one of Hybrid Automatic Repeat Request (ARQ), Acknowledged Radio Link Control (AM-RLC), Radio Link Control—Unacknowledged Mode Radio Link Control (UM-RLC), Media Access Control (MAC) and High Speed Downlink Packet Access (HSDPA) protocols.

* * * * *